(12) United States Patent
Santyar et al.

(10) Patent No.: US 10,766,461 B2
(45) Date of Patent: Sep. 8, 2020

(54) VARIABLE SWEEP ANGLE MOTOR DRIVE

(71) Applicant: ROSEMOUNT AEROSPACE INC., Burnsville, MN (US)

(72) Inventors: Srivatsa Santyar, Karnataka (IN); Guru Prasad Mahapatra, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 169 days.

(21) Appl. No.: 16/143,953

(22) Filed: Sep. 27, 2018

(65) Prior Publication Data

US 2019/0023228 A1 Jan. 24, 2019

Related U.S. Application Data

(62) Division of application No. 15/066,690, filed on Mar. 10, 2016, now Pat. No. 10,106,127.

(30) Foreign Application Priority Data

Dec. 18, 2015 (IN) .............................. 6766/CHE/2015

(51) Int. Cl.
*B60S 1/08* (2006.01)
*B60S 1/22* (2006.01)
(Continued)

(52) U.S. Cl.
CPC ............ *B60S 1/0896* (2013.01); *B08B 1/001* (2013.01); *B60S 1/06* (2013.01); *B60S 1/163* (2013.01);
(Continued)

(58) Field of Classification Search
CPC .......... B60S 1/06; B60S 1/0896; B60S 1/166; B60S 1/163; B60S 1/24; B60S 1/245;
(Continued)

(56) References Cited

U.S. PATENT DOCUMENTS 4,934,014 A * 6/1990 Yamamoto .............. B60S 1/185
15/250.12
5,142,728 A * 9/1992 Yamamoto .............. B60S 1/185
15/250.13
(Continued)

FOREIGN PATENT DOCUMENTS

EP 0217494 A1 4/1987
EP 1197407 A1 4/2002
(Continued)

OTHER PUBLICATIONS

EP SR dated May 8, 2017 in U310712EP, EP Application No. 16204827, 5 pages.

*Primary Examiner* — Gary K. Graham
(74) *Attorney, Agent, or Firm* — Cantor Colburn LLP

(57) ABSTRACT

A windshield wiper system for an aircraft is provided and includes a motor, an output shaft, a wrap spring and crank rocker mechanism (WSCRM) to which the motor and the output shaft are coupled and a controller. By way of the WSCRM, first directional rotation input to the WSCRM from the motor via a two-stage gear reduction is converted such that the output shaft drives wiper blade oscillation through a first sweep angle and second directional rotation input to the WSCRM from the motor is converted such that the output shaft drives wiper blade oscillation through a second sweep angle. The controller is configured to control the motor such that the first directional rotation is continuously or non-continuously input during first or second flight conditions, respectively, and the second directional rotation is continuously input during third flight conditions.

18 Claims, 3 Drawing Sheets

(51) Int. Cl.
  *B60S 1/24* (2006.01)
  *B60S 1/26* (2006.01)
  *B64C 1/14* (2006.01)
  *B08B 1/00* (2006.01)
  *B60S 1/16* (2006.01)
  *B60S 1/06* (2006.01)

(52) U.S. Cl.
  CPC ............... *B60S 1/166* (2013.01); *B60S 1/22* (2013.01); *B60S 1/245* (2013.01); *B60S 1/26* (2013.01); *B64C 1/14* (2013.01); *B64C 1/1476* (2013.01); *Y10T 74/18056* (2015.01)

(58) Field of Classification Search
  CPC . B64C 1/14; Y10T 74/2179; Y10T 74/18184; Y10T 74/2114; Y10T 74/18456; Y10T 74/1519; Y10T 74/1518; Y10T 74/18056
  USPC .................. 15/250.3, 250.13; 74/25, 75, 522
  See application file for complete search history.

(56) References Cited

U.S. PATENT DOCUMENTS

| | | | |
|---|---|---|---|
| 5,333,351 A | 8/1994 | Sato | |
| 5,570,488 A * | 11/1996 | Deng | B60S 1/185 15/250.13 |
| 5,690,207 A * | 11/1997 | Scherch | B60S 1/185 15/250.16 |
| 6,131,474 A | 10/2000 | Powell, Jr. | |
| 6,851,157 B2 | 2/2005 | Zimmer | |
| 7,565,728 B2 | 7/2009 | Kraus | |
| 2010/0320051 A1 * | 12/2010 | Schmidt | F16D 49/02 192/75 |

FOREIGN PATENT DOCUMENTS

| | | |
|---|---|---|
| JP | H03125655 U | 12/1991 |
| JP | 04310454 A | 11/1992 |

* cited by examiner

VARIABLE SWEEP ANGLE MOTOR DRIVE

CROSS-REFERENCE TO RELATED APPLICATIONS

This application claims the benefit of U.S. patent application Ser. No. 15/066,690, filed Mar. 10, 2016, which claims priority to Indian Patent Application No. 6766/CHE/2015, filed Dec. 18, 2015. The entire contents of U.S. patent application Ser. No. 15/066,690 and Indian Patent Application No. 6766/CHE/2015 are incorporated herein by reference.

BACKGROUND OF THE DISCLOSURE

The subject matter disclosed herein relates to variable sweep angle motor drives and, more particularly, to variable sweep angle motor drives for windshield washer systems.

Windshield wiper systems are used in aircraft to clean the windshield during rain. Current wiper system technology includes motor converter internal drive systems that enable a fixed sweep angle and an offset parking angle by way of an eccentric with a wrap spring and a crank rocker mechanism. That is, in many wiper systems, output shaft oscillation produces the sweep angle and is achieved by the crank rocker mechanism. The offset parking angle, on the other hand, is achieved by a dynamic varying of the eccentric position or an effective link length using the wrap spring while the motor is operated in reverse direction. The two positions of the eccentric are locked by the wrap spring and a stopper on the link.

A drawback of the current wiper systems exists, however, in that the sweep and park angles are fixed and cannot be changed once the hardware design is set.

BRIEF DESCRIPTION OF THE DISCLOSURE

According to one aspect of the disclosure, a windshield wiper system for an aircraft is provided and includes a motor, an output shaft, a wrap spring and crank rocker mechanism (WSCRM) to which the motor and the output shaft are coupled and a controller. By way of the WSCRM, first directional rotation input to the WSCRM from the motor is converted such that the output shaft drives wiper blade oscillation through a first sweep angle and second directional rotation input to the WSCRM from the motor is converted such that the output shaft drives wiper blade oscillation through a second sweep angle. The controller is configured to control the motor such that the first directional rotation is continuously or non-continuously input during first or second flight conditions, respectively, and the second directional rotation is continuously input during third flight conditions.

In accordance with additional or alternative embodiments, the second sweep angle is narrower than the first sweep angle.

In accordance with additional or alternative embodiments, the first sweep angle is about 51 degrees and the second sweep angle is about 39 degrees.

In accordance with additional or alternative embodiments, the first flight conditions are low speed flight conditions, the second flight conditions are characterized in that a wiper blade parking mode is in effect and the third flight conditions are high speed flight conditions.

In accordance with additional or alternative embodiments, the controller is configured to stop the first directional rotation input during the second flight conditions such that the output shaft causes wiper blade parking along the first sweep angle.

In accordance with additional or alternative embodiments, the wiper blade parking is provided at inboard or outboard positions along the first sweep angle.

In accordance with additional or alternative embodiments, an eccentric of the WSCRM has an eccentricity of about 0.05 inches.

In accordance with additional or alternative embodiments, a stopper of the WSCRM is fixed.

In accordance with additional or alternative embodiments, the WSCRM includes first and second stoppers at first and second positions respectively associated with the first or second directional rotations.

According to another aspect of the disclosure, a method of operating an aircraft windshield wiper system is provided. The windshield wiper system includes a motor, an output shaft and a wrap spring and crank rocker mechanism (WSCRM) to which the motor and the output shaft are coupled. The method includes determining whether first, second or third flight conditions are in effect, controlling the motor to continuously input first directional rotation to the WSCRM during the first flight conditions whereby the output shaft drives wiper blade oscillation through a first sweep angle, controlling the motor to non-continuously input first directional rotation to the WSCRM during the second flight conditions whereby the output shaft causes wiper blade parking along the first sweep angle and controlling the motor to continuously input second directional rotation to the WSCRM during the third flight conditions whereby the output shaft drives wiper blade oscillation through a second sweep angle.

In accordance with additional or alternative embodiments, the second sweep angle is narrower than the first sweep angle.

In accordance with additional or alternative embodiments, the first sweep angle is about 51 degrees and the second sweep angle is about 39 degrees.

In accordance with additional or alternative embodiments, the first flight conditions are determined to be in effect during low speed flight conditions, the second flight conditions are determined to be in effect when a wiper blade parking mode is in effect and the third flight conditions are determined to be in effect during high speed flight conditions.

In accordance with additional or alternative embodiments, the wiper blade parking is provided at inboard or outboard positions along the first sweep angle.

In accordance with additional or alternative embodiments, the controlling of the motor to non-continuously input first directional rotation to the WSCRM during the second flight conditions includes stopping the first directional rotation input.

In accordance with additional or alternative embodiments, an eccentric of the WSCRM has an eccentricity of about 0.05 inches.

In accordance with additional or alternative embodiments, the method further includes fixing a position of a stopper.

In accordance with additional or alternative embodiments, the WSCRM includes first and second stoppers at first and second positions respectively associated with the first or second directional rotations.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a wrap spring and crank rocker mechanism (WSCRM) with a modified eccentric is provided for a windshield wiper system. The WSCRM is configured to support two different sweep angles instead of one sweep and one park angle. The two different sweep angles are achieved by continuous motor rotation in first and second directions and by way of a reduced center distance between crank and rocker axes and a change in eccentric value that result in two distinct link lengths.

Figure 1:
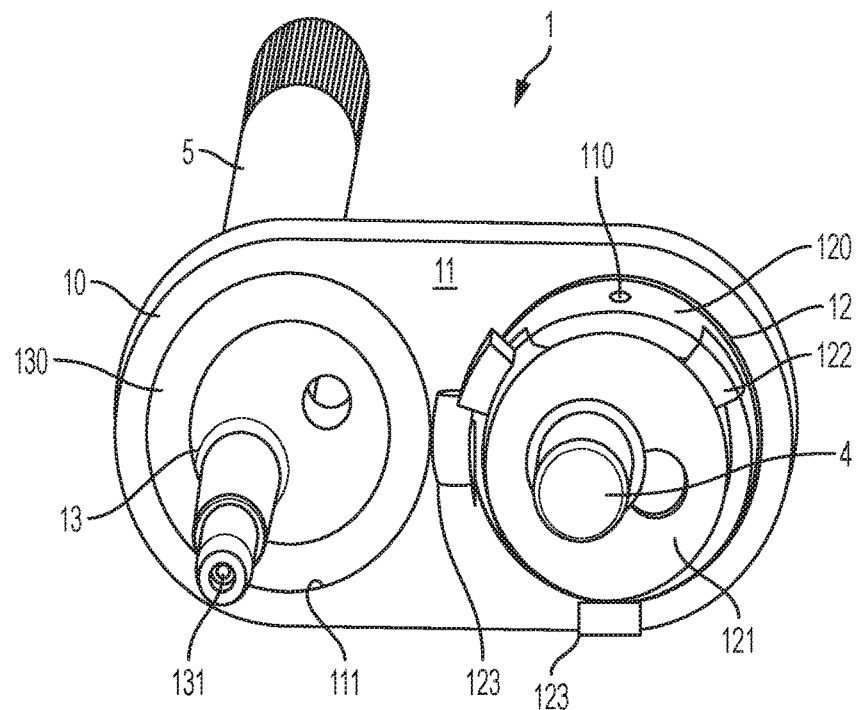
FIG. 1 is a perspective view of a wrap spring and crank rocker mechanism of a windshield wiper system in accordance with embodiments.
Figure 2:
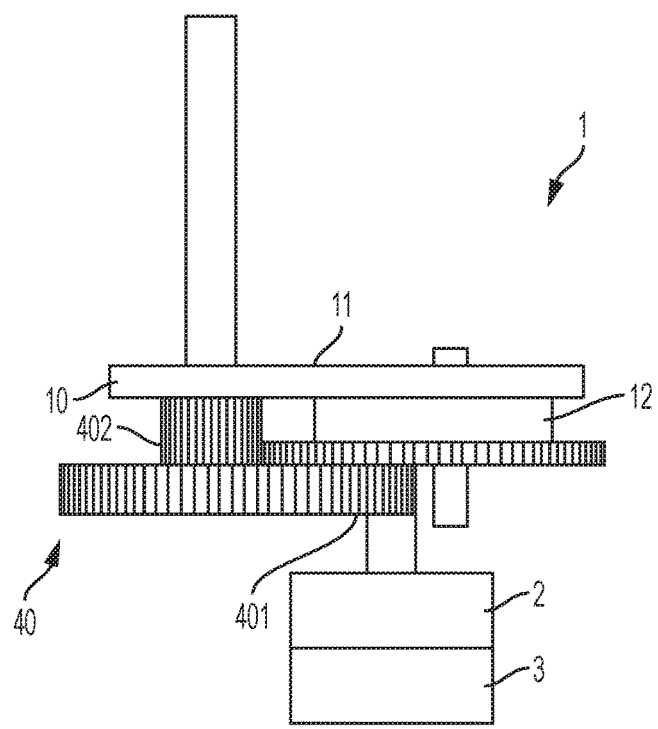
FIG. 2 is a schematic top down view of a motor, a controller and the wrap spring and crank rocker mechanism of FIG. 1.

With reference to FIGS. 1 and 2 and with additional reference to FIGS. 3-5 and FIGS. 7A-7B, a windshield wiper system 1 is provided and includes a motor 2, a controller 3, a crank shaft 4, a rocker output shaft 5 and a WSCRM 10. The windshield wiper system 1 may be provided on any aircraft or ground-based vehicle and is configured with multiple wiper blades that are biased toward a windshield of the aircraft/vehicle. The motor 2 may be any motor that can generate rotational energy in forward or clockwise (hereinafter referred to as "first directional rotation input") or reverse or counter-clockwise (hereinafter referred to as "second directional rotation input") directions. The controller 3 is coupled to the motor 2 and is configured to control the motor 2 such that the motor 2 continuously provides the first directional rotational input to the WSCRM 10 during first flight conditions, such that the motor 2 non-continuously provides the first directional rotational input to the WSCRM 10 during second flight conditions and such that the motor 2 continuously provides the second directional rotational input to the WSCRM 10 during third flight conditions.

The controller 3 may be provided as a flight control computer including a processing circuit or an electronic control unit, which is receptive of pilot input commands from a pilot console along with current flight conditions from on-board and off-board sensors, and a storage unit. The storage unit includes various types of memory and has executable instructions stored thereon, which, when executed, cause the electronic control unit to execute the methods and actions described herein.

In accordance with embodiments, the first flight conditions may be defined as low-speed flight conditions or, more particularly, as flight conditions in which the aircraft or vehicle is traveling at less than 75 knots. The first flight conditions may be further defined as rainy conditions or conditions in which the pilot has activated the windshield wiper system 1 via the pilot console. The second flight conditions may be defined flight conditions in which the pilot has deactivated the windshield wiper system 1. The third flight conditions may be defined as high-speed flight conditions or, more particularly, as flight conditions in which the aircraft or vehicle is traveling at an excess of 75 knots.

With continued reference to FIGS. 1-5 and with additional reference to FIGS. 6A-7B, the motor 2 is coupled to the WSCRM 10 by way of the crank shaft 4 and a two stage gear reduction mechanism 40, including a first stage 401 and a second stage 402, that provides for required oscillating speeds and torque at the rocker output shaft 5. The rocker output shaft 5 is directly coupled to the WSCRM 10. The WSCRM 10 is configured such that when the first directional rotation input is continuously input to the WSCRM 10 from the motor 2 via the crank shaft 4 and the gear reduction mechanism 40 in accordance with servo commands issued by the controller 3 with the first flight conditions being in effect, the first directional rotation input is converted by the WSCRM 10 such that the rocker output shaft 5 drives wiper blade oscillation through a first sweep angle (e.g., sweep angle 1 of FIG. 6A). The WSCRM 10 is further configured such that when the first directional rotation input is non-continuously input to the WSCRM 10 from the motor 2 via the crank shaft 4 and the gear reduction mechanism 40 in accordance with servo commands issued by the controller 3 with the second flight conditions being in effect, the first directional rotation input is converted by the WSCRM 10 such that the rocker output shaft 5 drives wiper blade parking at an in-board or out-board position along the first sweep angle. The WSCRM 10 is further configured such that when the second directional rotation input is continuously input to the WSCRM 10 from the motor 2 via the crank shaft 4 and the gear reduction mechanism 40 in accordance with servo commands issued by the controller 3 with the third flight conditions being in effect, the second directional rotation input is converted by the WSCRM 10 such that the rocker output shaft 5 drives wiper blade oscillation through a second sweep angle (e.g., sweep angle 2 of FIG. 7A).

Figure 3:
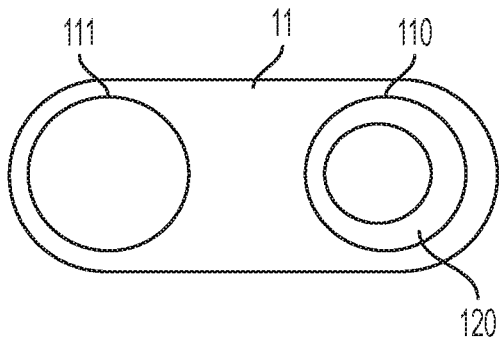
FIG. 3 is a plan view of an eccentric of the wrap spring and crank rocker mechanism of FIG. 1 in a first position.
Figure 4:
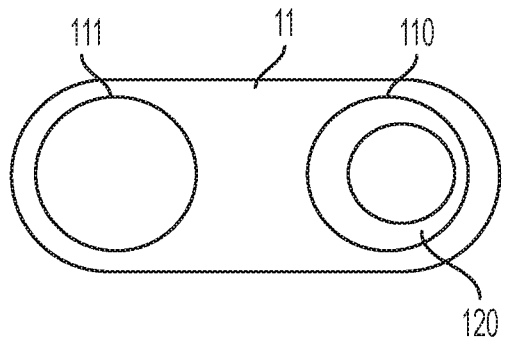
FIG. 4 is a plan view of an eccentric of the wrap spring and crank rocker mechanism of FIG. 1 in a second position

The WSCRM 10 includes a link element 11, a crank element 12 and a rocker element 13. The link element is formed to define a first annulus 110 at a first end thereof, in which the crank element 12 is operably disposable, and a second annulus 111 at a second end thereof, in which the rocker element 13 is operably disposable. The crank element 12 includes an eccentric 120, which is securably rotatable within the first annulus 110 to assume a first rotational position as shown in FIG. 3 or to assume a second rotational position as shown in FIG. 4, a cam 121, a wrap spring 122 and at least one stopper 123. Rotation of the cam 121 relative to the eccentric is driven by the motor 2 by way of the crank shaft 4 and the gear reduction mechanism 40 with the crank shaft 4 being offset from a central axis of the eccentric 120 by shaft offset E, and is opposed by the wrap spring 122 and the at least one stopper 123. The rocker element 13 includes an annular main member 130, which is securably rotatable within the second annulus 111 and from which the rocker output shaft 5 extends, and a rocker 131 that is offset from a central axis of the annular main member 130 by offset S.

The at least one stopper 123 may be provided as a single stopper 123 or as multiple stoppers 123. In the former case, the single stopper 123 may be fixed circumferentially relative to the eccentric 120. Thus, when the controller 3 controls the motor 2 to input the first and second directional rotations to the WSCRM 10, opposite sides of the heads of the wrap spring 122 come into contact with opposite sides of the single stopper 123. Conversely, in the case of the multiple stoppers 123, one stopper 123 may be disposed at a first circumferential position relative to the eccentric 120 and one stopper 123 may be disposed at a second circumferential position relative to the eccentric 120.

Figure 5:
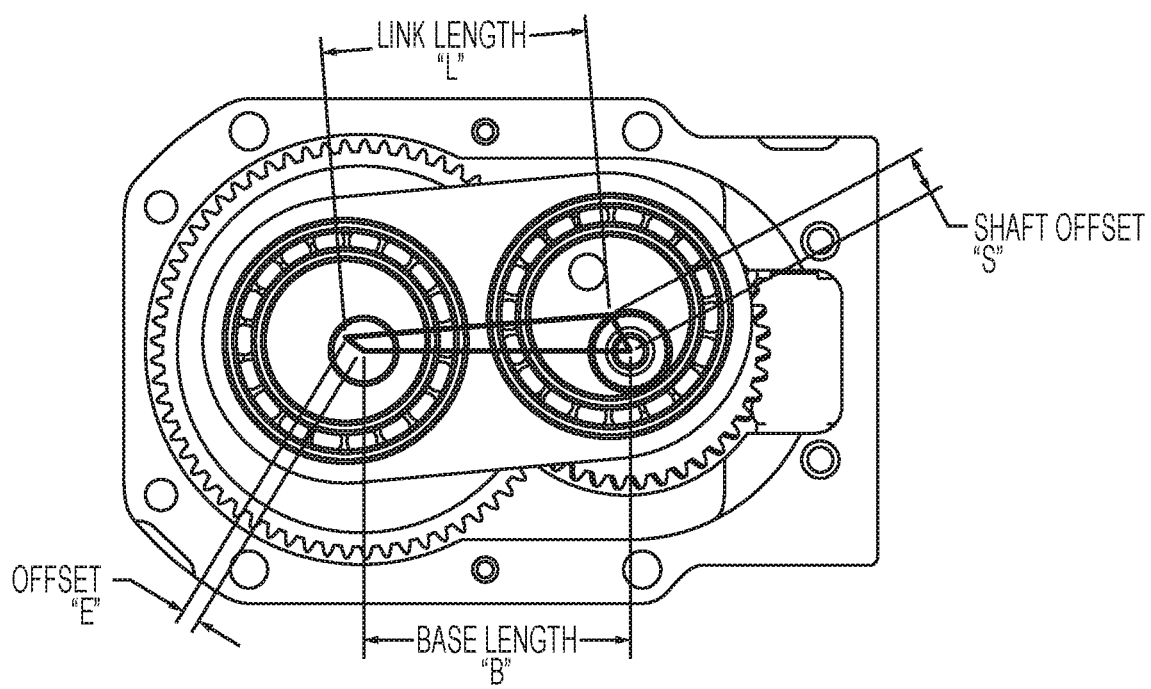
FIG. 5 is a front view of the wrap spring and crank rocker mechanism of FIG. 1.
Figure 6A:
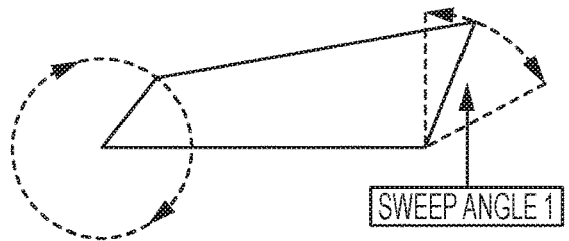
FIG. 6A is a diagram illustrating a first sweep angle of a windshield wiper system.
Figure 6B:
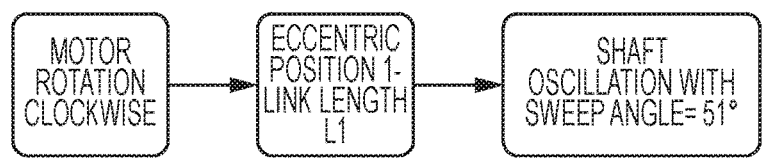
FIG. 6B is a flow diagram illustrating an operation of the windshield wiper system of FIG. 6A.
Figure 7A:
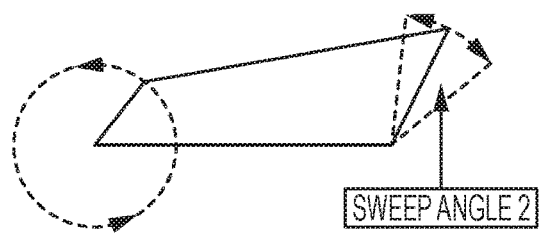
FIG. 7A is a diagram illustrating a second sweep angle of a windshield wiper system.
Figure 7B:
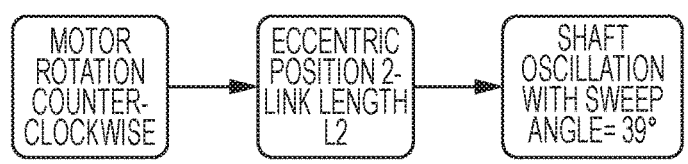
FIG. 7B is a flow diagram illustrating an operation of the windshield wiper system of FIG. 7A.

As shown in FIG. 5, the rotational position of the eccentric 120 may be controlled by the controller 3 or some other suitable servo element and defines an effective link length L of the WSCRM 10 as being a first link length L1, which is equal to the distance between the respective central axes of the eccentric 120 and the annular main member 130 when the eccentric 120 assumes the first rotational position as shown in FIG. 3, or a second link length L2, which is equal to the distance between the respective central axes of the eccentric 120 and the annular main member 130 when the eccentric 120 assumes the second rotational position as shown in FIG. 4. The base length B of the WSCRM 10 is the distance between a mounting/center axis of crank shaft 4 and mounting/center axis of rocker 131.

In accordance with embodiments, an eccentricity of the eccentric 120 may be increased to 0.05 inches (from 0.043 inches as found in similar features in conventional mechanisms). Thus, with a base length B being reduced from about 1.757 inches to about 1.6 inches, the first sweep angle may be about 51° and the second sweep angle may be about 39°. As such, since the second sweep angle is narrower than the first sweep angle, power requirements of the windshield wiper system 1 can be reduced during the third flight conditions when the relatively high speed of the aircraft/vehicle may demand that such available power be redirected to other systems.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of operating an aircraft windshield wiper system comprising a motor, an output shaft and a wrap spring and crank rocker mechanism (WSCRM) to which the motor and the output shaft are coupled, the method comprising:
   determining whether first, second or third flight conditions are in effect;
   controlling the motor to continuously input first directional rotation to the WSCRM during the first flight conditions whereby the output shaft drives wiper blade oscillation through a first sweep angle;
   controlling the motor to non-continuously input first directional rotation to the WSCRM during the second flight conditions whereby the output shaft causes wiper blade parking along the first sweep angle; and
   controlling the motor to continuously input second directional rotation to the WSCRM during the third flight conditions whereby the output shaft drives wiper blade oscillation through a second sweep angle.

2. The method according to claim 1, wherein the second sweep angle is narrower than the first sweep angle.

3. The method according to claim 1, wherein the first sweep angle is about 51 degrees and the second sweep angle is about 39 degrees.

4. The method according to claim 1, wherein:
   the first flight conditions are determined to be in effect during low speed flight conditions,
   the second flight conditions are determined to be in effect when a wiper blade parking mode is in effect, and
   the third flight conditions are determined to be in effect during high speed flight conditions.

5. The method according to claim 1, wherein the wiper blade parking is provided at inboard or outboard positions along the first sweep angle.

6. The method according to claim 1, wherein the controlling of the motor to non-continuously input first directional rotation to the WSCRM during the second flight conditions comprises stopping the first directional rotation input.

7. The method according to claim 1, wherein an eccentric of the WSCRM has an eccentricity of about 0.05 inches.

8. The method according to claim 1, further comprising fixing a position of a stopper.

9. The method according to claim 1, wherein the WSCRM comprises first and second stoppers at first and second positions respectively associated with the first or second directional rotations.

10. A method of operating an aircraft windshield wiper system, the method comprising:
    determining whether first, second or third flight conditions are in effect;
    continuously inputting first directional rotation to a wrap spring and crank rocker mechanism (WSCRM) during the first flight conditions to drive wiper blade oscillation through a first sweep angle;
    non-continuously inputting the first directional rotation to the WSCRM during the second flight conditions to cause wiper blade parking along the first sweep angle; and
    continuously inputting second directional rotation to the WSCRM during the third flight conditions to drive wiper blade oscillation through a second sweep angle.

11. The method according to claim 10, wherein the second sweep angle is narrower than the first sweep angle.

12. The method according to claim 10, wherein the first sweep angle is about 51 degrees and the second sweep angle is about 39 degrees.

13. The method according to claim 10, wherein:
    the first flight conditions are determined to be in effect during low speed flight conditions,
    the second flight conditions are determined to be in effect when a wiper blade parking mode is in effect, and
    the third flight conditions are determined to be in effect during high speed flight conditions.

14. The method according to claim 10, wherein the wiper blade parking is provided at inboard or outboard positions along the first sweep angle.

15. The method according to claim 10, wherein the non-continuous inputting of the first directional rotation to the WSCRM during the second flight conditions comprises stopping the first directional rotation input.

16. The method according to claim 10, wherein the WSCRM has an eccentricity of about 0.05 inches.

17. The method according to claim 10, further comprising fixing a position of a stopper.

18. The method according to claim 10, wherein the WSCRM comprises first and second stoppers at first and second positions respectively associated with the first or second directional rotations.

* * * * *